United States Patent [19]
De Wille

[11] Patent Number: 5,983,143
[45] Date of Patent: Nov. 9, 1999

[54] CONTROL UNIT WITH DYNAMICALLY MANAGED TIMERS

[75] Inventor: Eberhard De Wille, Schmidmuehlen, Germany

[73] Assignee: Siemens Aktiengesellschaft, Munich, Germany

[21] Appl. No.: 08/971,490

[22] Filed: Nov. 17, 1997

[30] Foreign Application Priority Data

Nov. 15, 1996 [DE] Germany .......................... 196 47 407

[51] Int. Cl.⁶ ............................. G06G 7/76; G06F 11/00
[52] U.S. Cl. ................................. 701/1; 701/29; 701/30; 701/31; 701/32; 701/33; 364/130
[58] Field of Search .................................. 701/1, 29, 30, 701/31, 32, 33; 364/130

[56] References Cited

U.S. PATENT DOCUMENTS

| | | |
|---|---|---|
| 4,347,570 | 8/1982 | Akiyama et al. . |
| 5,552,991 | 9/1996 | Lee et al. .................................. 364/130 |
| 5,715,161 | 2/1998 | Seo ........................................... 364/130 |

*Primary Examiner*—William A. Cuchlinski, Jr.
*Assistant Examiner*—Olga Hernandez
*Attorney, Agent, or Firm*—Herbert L. Lerner; Laurence A. Greenberg

[57] ABSTRACT

In a control unit, particularly for use in a motor vehicle, time measurement and time control should be independent of computer-specific cycle times. The control unit includes a quartz-controlled timer with a specified clock frequency and a global timer clocked by the quartz-controlled timer. The global timer furnishes a global timing pulse as a reference time for all the program parts of the computer. A plurality of dynamically managed program-controlled timers, which receive their clock signal from the global timer, are requested by the computer program each for one time measurement associated with a specific task. After the specific task is completed, the timer is available for further tasks.

5 Claims, 6 Drawing Sheets

FIG 2
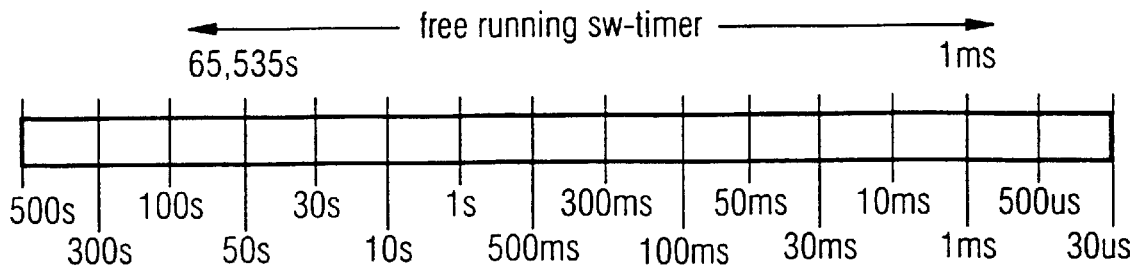
FIG 4
| Bit # tmr stt byt | 7 | 6 | 5 | 4 | 3 | 2 | 1 | 0 |
|---|---|---|---|---|---|---|---|---|
| Timer-id | 80 | 40 | 20 | 10 | 08 | 04 | 02 | 01 |
FIG 5
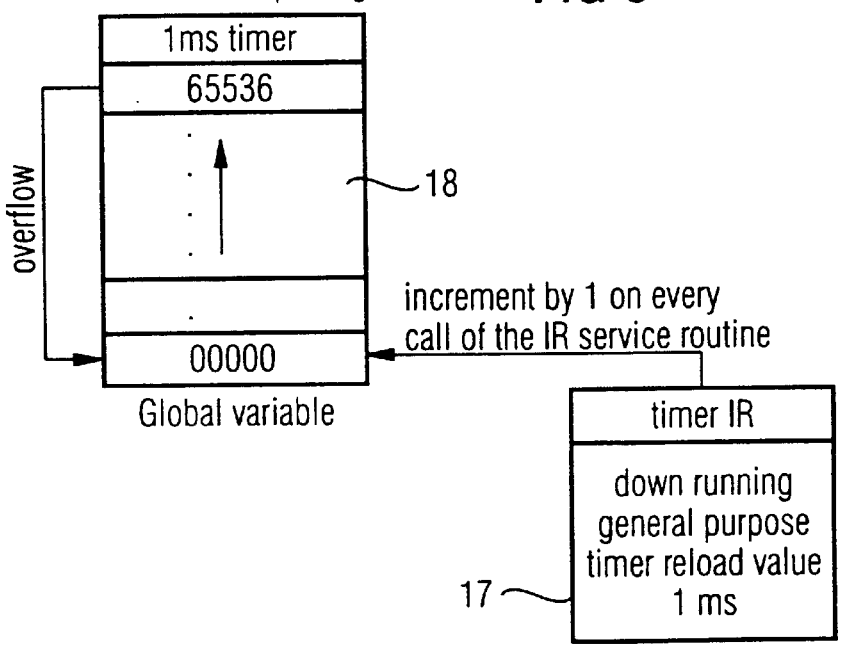

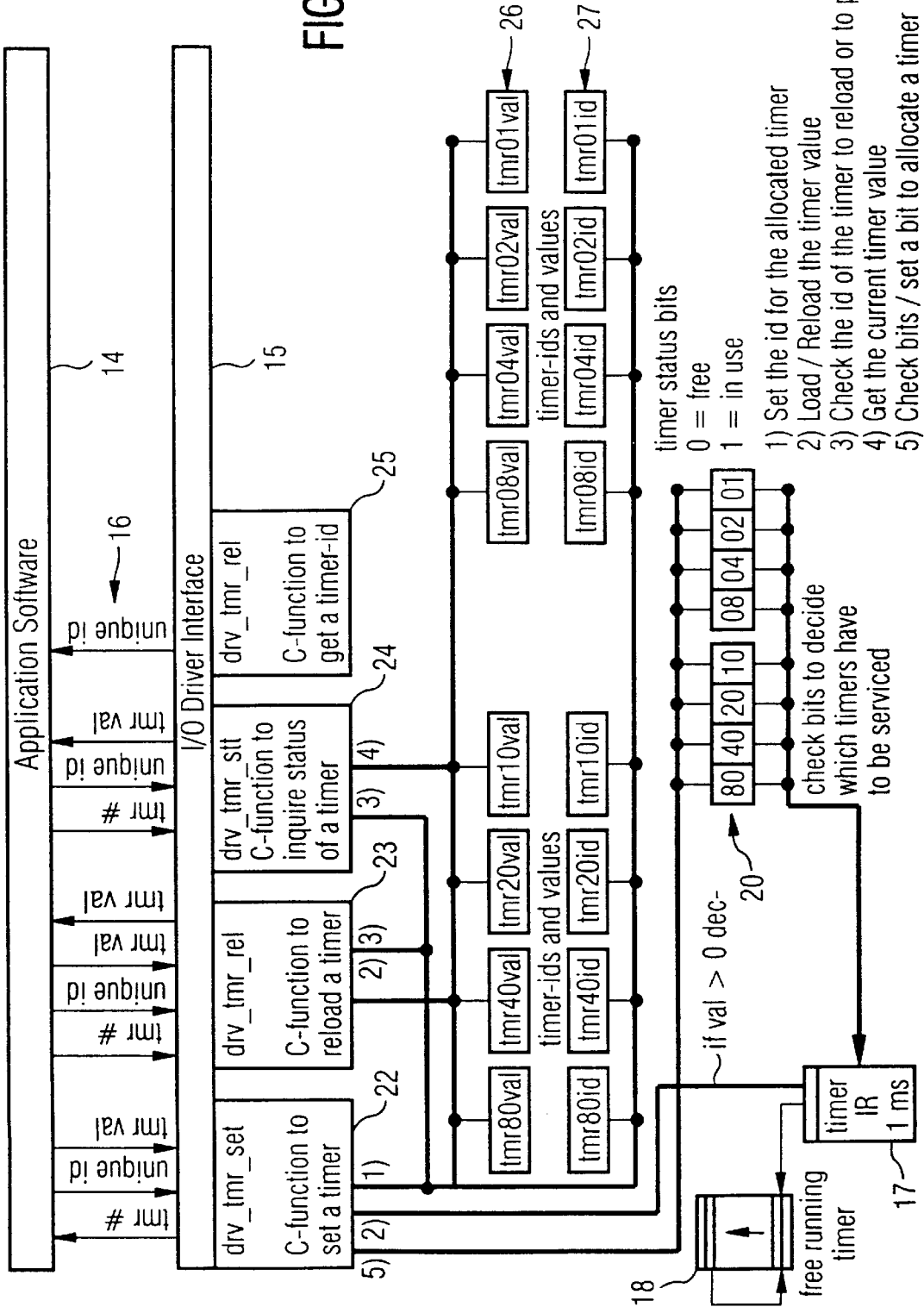

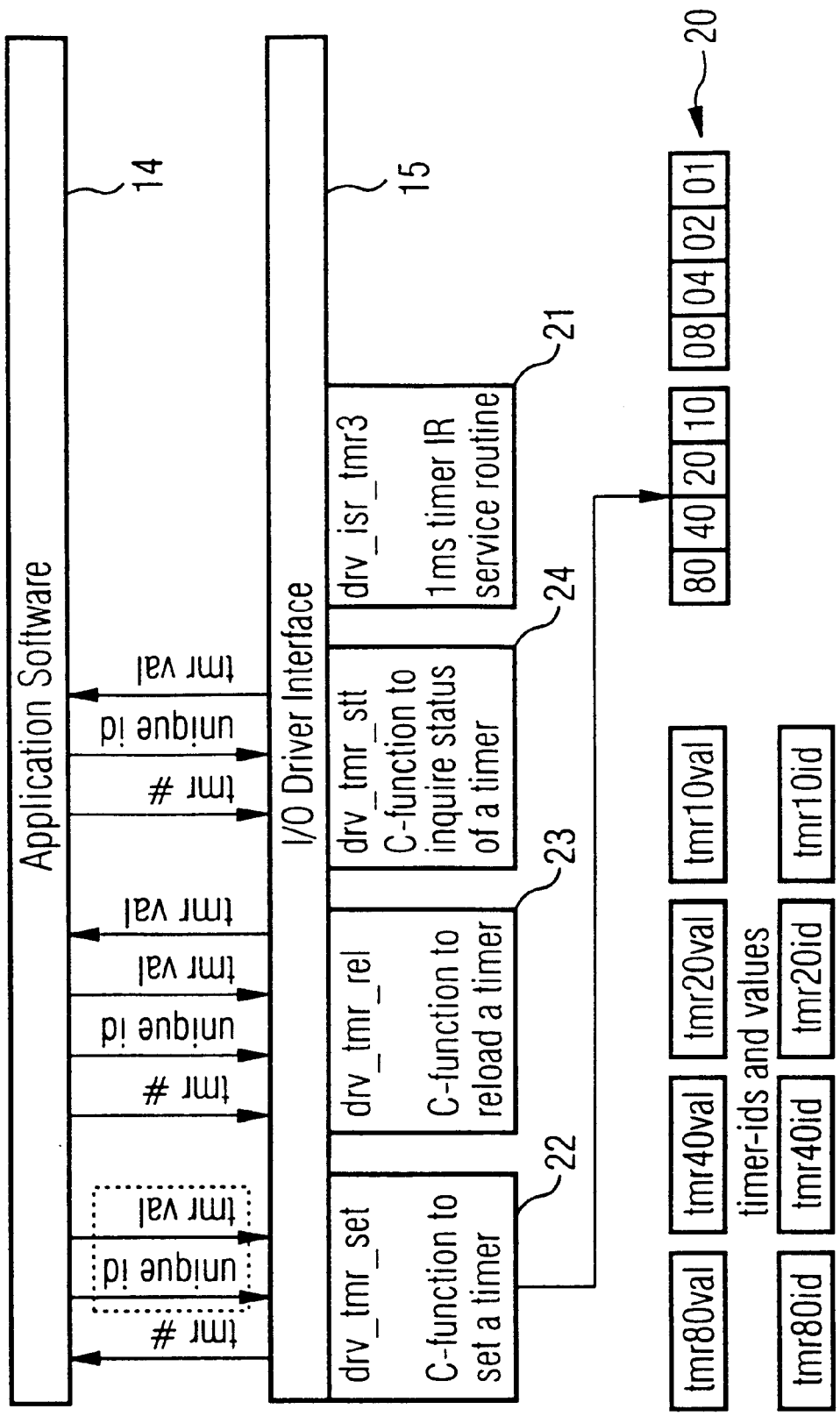

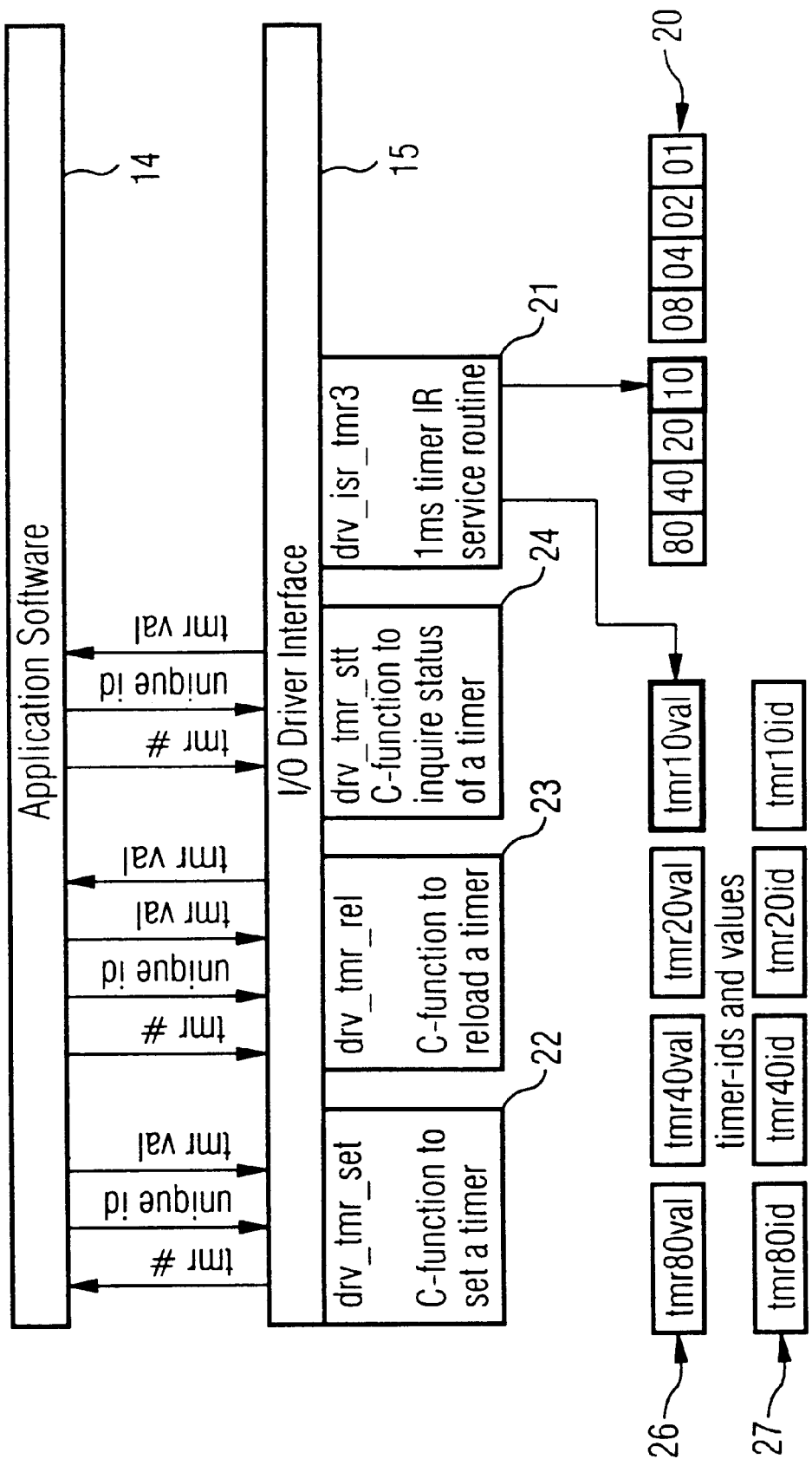

CONTROL UNIT WITH DYNAMICALLY MANAGED TIMERS

BACKGROUND OF THE INVENTION

1. Field of the Invention

The invention relates to a control unit, in particular for use in a motor vehicle. The control unit has a computer, a program memory, a data memory, and timers generating clock signals serving to execute computer programs.

Such control units are used in motor vehicles, for instance, for transmission control, engine control or the like, but can also be used for other purposes. The control units contain a computer, for instance in the form of a microcontroller or microcomputer, that runs application programs specified by the particular intended use.

In the control unit, times must be measured and sequences over time must be controlled. Given the now typical use of operating systems in microcontroller technology, fixed cycle times are often no longer present, or they change frequently. This makes time measurement and chronological sequence control difficult. In conventional control units, either the cycle times are used as a timing pulse, or internal timers in the computer or external timers are used to generate the timing pulse. Timer-counter variables or timer-counter fields are also used, which are supplied with one of the aforementioned timing pulses. Each application in the programs to be executed requires its own timer variable. Time measurement is also dependent on the cycle time or on the resolution of the timer.

U.S. Pat. No. 4,347,570 to Akiyama et al. describes a control unit—embodied as an ignition control system for motor vehicles—wherein the beginning and end of excitation of ignition coils is determined by a microprocessor at fixed time intervals, in dependence on a plurality of engine operating parameters. The main program can be interrupted by three different interrupts, each of different priority.

SUMMARY OF THE INVENTION

It is accordingly an object of the invention to provide a control unit, in particular for use in a motor vehicle, with dynamically managed timers, which overcomes the above-mentioned disadvantages of the prior art devices and methods of this general type and in which the time measurement and time control are independent of cycle times.

With the foregoing and other objects in view there is provided, in accordance with the invention, a control unit, in particular for a motor vehicle, comprising:

a computer, a program memory and a data memory connected to the computer;

a plurality of timers connected to the computer for generating clock signals for the execution of computer programs, the plurality of timers including:

a quartz-controlled timer with a specified clock frequency; a global timer clocked by the quartz-controlled timer, the global timer furnishing a global timing pulse as a reference time for all program parts of the computer; and a plurality of dynamically managed program-controlled timers;

wherein the computer is programmed to request a respective one of the program-controlled timers for a time measurement associated with a specific program task, and to release the one program-controlled timer after completion of the program task and to render the one program-controlled timer available for further tasks.

In accordance with an added feature of the invention, the computer is a microcontroller, the microcontroller including an internal free running timer having a timing pulse with a resolution of approximately one millisecond.

In accordance with an additional feature of the invention, the global timer issues the global timing pulse covering a time range from zero to 65,535 milliseconds, with a resolution of approximately one millisecond.

In accordance with a concomitant feature of the invention, the program-controlled timers are dynamically managed by a plurality of C functions.

The advantages of the invention reside in particular in the fact that the application programs (hereinafter also called application software or application SW) are more easily portable and can be constructed in modular fashion. Because of the dynamic management of program-controlled timers, RAM storage space can be saved, since a separate timer need not be made available for each application and instead the timers can be shared with other applications at staggered times. After whichever task is to be executed is completed, a timer is in fact then available to other parts of the program.

Other features which are considered as characteristic for the invention are set forth in the appended claims.

Although the invention is illustrated and described herein as embodied in a control unit, particularly for use in a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 2 is a timing diagram of the time range covered by a program-controlled timer of the control unit of FIG. 1;

FIG. 3 is a schematic function diagram illustrating the dynamic management of a plurality of program-controlled timers which are present in the control unit of FIG. 1;

FIG. 4 is a bit table showing an association of timer numbers with timer identifications;

FIG. 5 is a schematic of a free running timer in the control unit of FIG. 1, which generates a global timing pulse; and FIGS. 6–8 are detailed views of the system of FIG. 3, explaining the dynamic timer administration in the control unit of FIG. 1.

DESCRIPTION OF THE PREFERRED EMBODIMENTS

Figure 1:
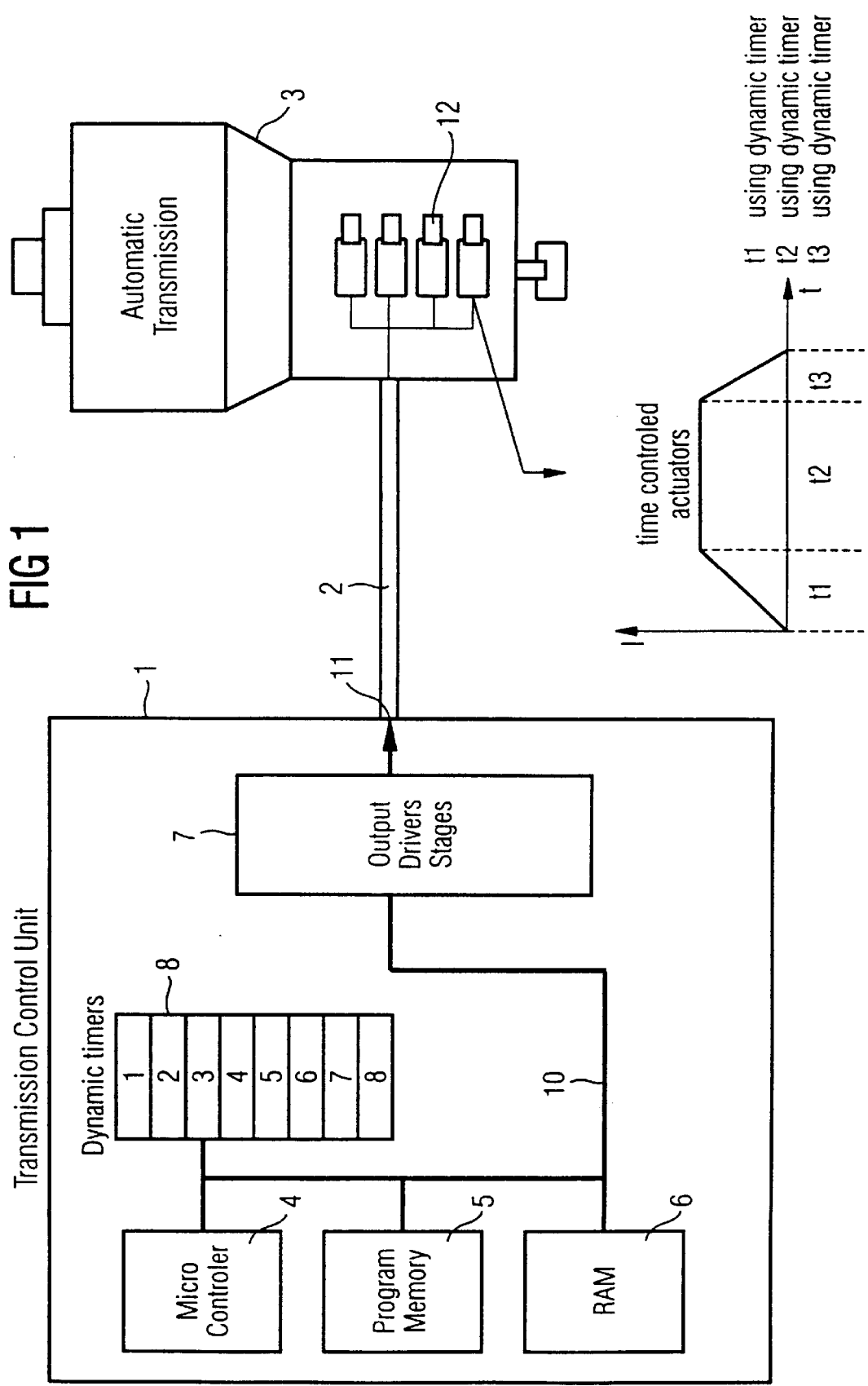
FIG. 1 is a schematic diagram of a control unit according to the invention, used to control an automatic motor vehicle transmission.

Referring now to the figures of the drawing in detail and first, particularly, to FIG. 1 thereof, there is seen a control unit 1. In the exemplary embodiment, the control unit 1 is a transmission control unit, which is connected to an automatic transmission 3 by a plurality of data lines or a bus 2. The control unit 1 includes a microcontroller or microprocessor 4, a program memory 5, typically embodied as a read-only memory (ROM), and a data memory or RAM 6. The control unit 1 further includes a plurality of output driver stages 7 combined into a block and a plurality of timers 8 (in the present exemplary embodiment, there are eight timers). An internal bus 10 interconnects these components 4–8 of the control unit 1 to one another and to a signal output 11.

The automatic transmission 3 includes four schematically illustrated actuators 12, such as electro-hydraulic valves. The actuators 12 are controlled by the control unit 1 and they carry out the shifting operations in the transmission, by engaging and disengaging various clutches and actuating and releasing brakes. The automatic transmission 3 is a well known automobile component and it will not be described in any further detail.

The time range covered by the timers provided in the control unit 1 is shown schematically in FIG. 2. At a resolution of 1 ms, i.e. where 1 ms is the smallest measurable time unit, a freely counting program-controlled timer 18, which will be explained hereinafter, is capable of covering a time range of 65,535 ms. It includes a 16-bit counter.

All of the various application programs—hereinafter also called application software or application SW—are represented by a block 14 (FIG. 3). Between the block 14 and an internal input/output program interface (I/O interface) 15, the following signals are exchanged on interface lines 16, where tmr always stands for the program-controlled timers:

tmr #: The number of a timer, which has been requested by a part of the program. If the number is transmitted by the interface 15 to the user SW 14, this means that the allocation or assignment of this timer has been successful.

unique id: A unique identification (hereinafter id) of a timer, which can be assigned only once for one application and cannot be used twice.

tmr val: The length of time or time counting value specified for a requested timer.

An id represents a number that is assigned not only for timers but also for a monitoring time (such as from 100 to 500 ms), for a counter, etc.

Figure 7:
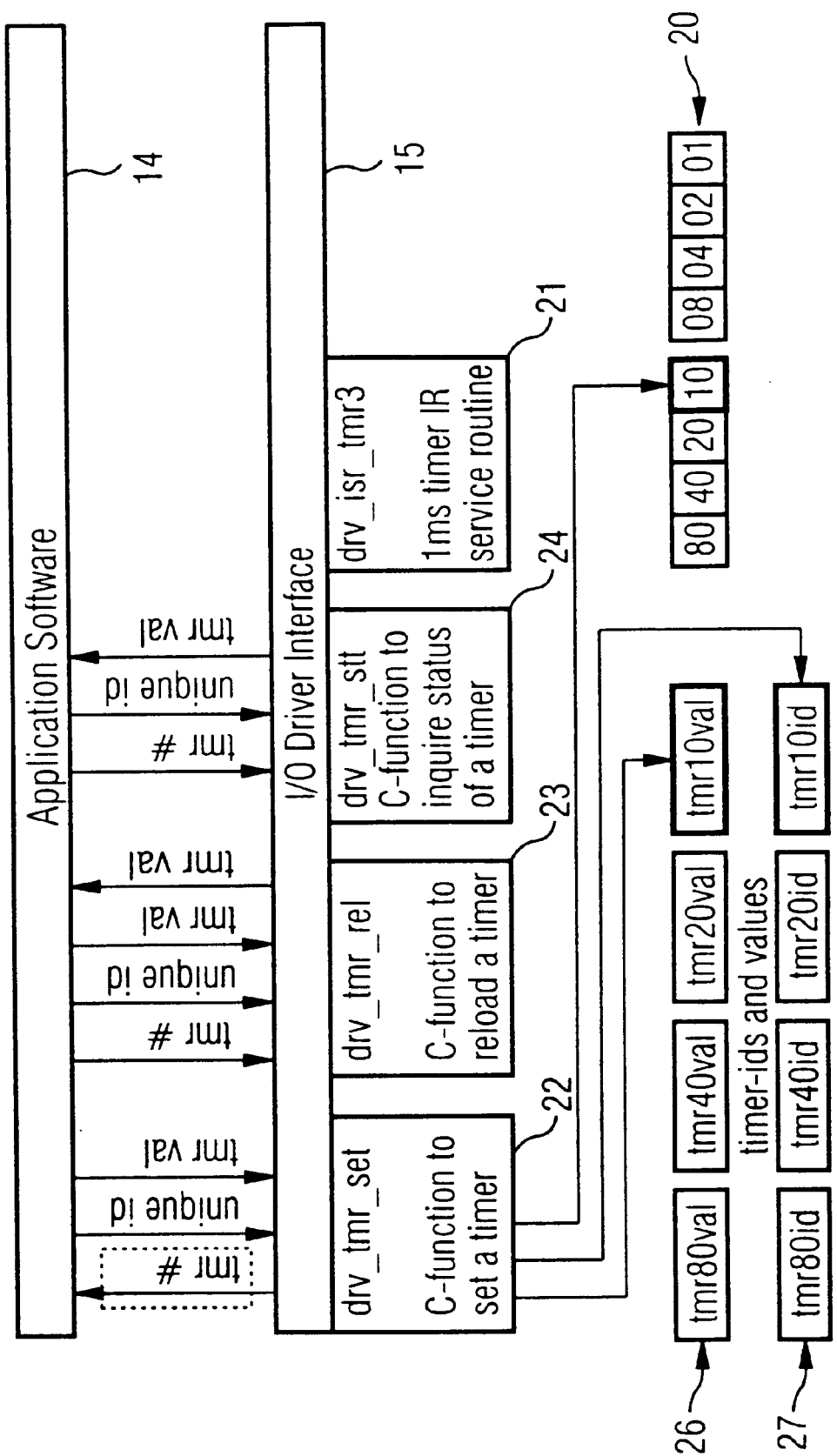

The control unit 1 has the following program-controlled timers, which are embodied in the microcontroller 4:

a relatively large number of program-controlled timers (hereinafter also called SW timers), which are identified by memory cell contents 20 and are clocked by a single quartz-controlled clock transducer (or HW timer) 17; and a free running or free counting program-controlled timer (free running SW timer) 18, which is clocked by the same quartz-controlled time 17. The timer 18 may also be referred to as a global timer 18. A function drv_isr_tmr3 (function block 21 in FIGS. 6, 7 and 8) corresponds to the timer 17; for the sake of completeness, it is shown in the drawing as a function with an interface to the application software.

In the exemplary embodiment described here, eight SW timers 20 are present, but their number can be increased arbitrarily; it will be appreciated that the number can be adapted to the particular requirement. Expediently, as many SW timers are provided as the highest number needed simultaneously in a particular application. Thus in a different application, for instance, 32 SW timers are provided.

In order to request, identify and occupy a free timer for a task to be executed by a user program, four functions are used, represented by function blocks 22–25 (FIG. 3). In the present exemplary embodiment, these functions are in the form of C functions.

A timer with a function drv_tmr_id (function block 25) is requested as follows:

Before a timer can be used, a unique timer id must be requested using the function drv_tmr_id. The function uses a static variable, which is incremented each time it is called up and generates a unique identification id, which is reported back to the requesting application program region. This id must be used as a reference for all further accesses to the associated timer. As an alternative to this, other identifications may be used, for instance in the form of a task id or ids, which are generated by the application. In that case, however, care must be taken that each id remain unique so that it is assigned only once.

An SW timer with a function drv_tmr_set (function block 22) is set in three steps:

First step (FIG. 6): The application program sends a unique id and the intended counting time to the timer request function. The timer request function then ascertains which SW timer will be free next. By way of example, this is SW timer number 7 (binary: 40). The SW timers are identified by the memory contents 20, which are represented in FIGS. 3–8 by small boxes containing the counter numbers. Each SW timer is assigned two memory cells: a first memory cell 26, into which the time counting value, that is, the period of time to be counted, is written, and a second memory cell 27, into which the timer id is written when a timer is assigned to a task. The timer request function then ascertains the next free SW timer 20. Here, it is timer number 7 (binary: 40): the data to be transmitted to the interface 15 by the application SW 14 are represented in FIG. 6 by a rectangle drawn in dotted lines.

Second step (FIG. 7): The timer function sets the unique id for the timer tmr10id, and the corresponding timer status bit tmr_stt_byt=10, and the period of time to be counted tmr10val. The number of the associated timer tmr # is returned to the application SW, as indicated in the drawing by a dotted-line rectangle.

Third step (FIG. 8): A continuously triggered IR (interrupt) service routine drv_isr_tmr3 (function block 21; as noted, corresponds to timer 17) checks the timer status bits. If a bit is set, the associated time counting value is compared with zero. If it is not equal to zero, then it is decremented by one. If it is equal to zero, then the status bit is deleted.

A timer is reloaded with the function drv_tmr_rel as follows (function block 23):

The application SW transmits a unique id to the timer reload function. This id must be the same as that used the first time the timer was set. The timer number, which was returned by the set function drv_tmr_set must likewise be sent to the reload function. In addition, the new period of time during which the timer is to run must be transmitted to the reload function.

The timer reload function requests the timer corresponding to the timer number and checks the unique id. If the two values do not fit, then the timer is already being used for some other task, and a timeout has occurred. The function also checks whether the time counting value is equal to zero. In this case, the time counting value "0" is reported back to the calling function, and the timer reload was unsuccessful. If the timer number and the unique id do fit and if the timer is still running, then it is reloaded with the desired time counting value.

The timer status by the function drv_tmr_stt (function block 24) is queried as follows:

The application SW transmits a unique id to the timer request function. This id must be the same one that was used the first time the timer was set. The timer number that was reported back by the function drv_tmr_set must also be transmitted to the request function.

FIG. 4 shows the association of the bit numbers of the individual program-controlled timers with the timer identifications (id) that correspond to the memory contents 20.

The free counting program-controlled timer 18 (FIG. 5) includes a variable, which serves as a global time reference and is incremented by one each time an interrupt (IR) routine is called up. This free running time counting value is initialized to the value of zero each time the program is started and then counts upward up to its maximum value (65535 ms).

The routine serving as a timer 17 (or HW timer) is hardware-controlled, or in other words is controlled with a quartz crystal. The clock frequency is 1 ms. Correspondingly, the time resolution of the free-running SW timer 18 is 1 ms. In other words, one counting value is equivalent to 1 ms.

In the above-described dynamic program-controlled timers, each timer, after completing the task it had been assigned, is available for an arbitrary further task. This advantageously reduces the demand for RAM storage space for a control unit.

I claim:

1. A control unit, comprising:

a computer, a program memory and a data memory connected to said computer;

a plurality of timers connected to said computer for generating clock signals for the execution of computer programs, said plurality of timers including:

a quartz-controlled timer with a specified-clock frequency;

a global timer clocked by said quartz-controlled timer, said global timer furnishing a global timing pulse as a reference time for all program parts of said computer; and a plurality of dynamically managed program-controlled timers;

wherein said computer is programmed to request a respective one of said program-controlled timers for a time measurement associated with a specific program task, and to release said one program-controlled timer after completion of the program task and to render said one program-controlled timer available for further tasks.

2. The control unit according to claim 1, wherein said computer is an onboard computer in a motor vehicle.

3. The control unit according to claim 1, wherein said computer is a microcontroller, said microcontroller including an internal free running timer having a timing pulse with a resolution of approximately one millisecond.

4. The control unit according to claim 1, wherein said global timer issues the global timing pulse covering a time range from zero to 65,535 milliseconds, with a resolution of approximately one millisecond.

5. The control unit according to claim 1, wherein said program-controlled timers are dynamically managed by a plurality of C functions.

* * * * *